United States Patent
Iizuka et al.

(10) Patent No.: US 12,117,516 B2
(45) Date of Patent: Oct. 15, 2024

(54) RADAR APPARATUS AND DISTANCE MEASUREMENT METHOD

(71) Applicant: Nippon Telegraph and Telephone Corporation, Tokyo (JP)

(72) Inventors: Tatsuya Iizuka, Musashino (JP); Fumihiko Ishiyama, Musashino (JP); Yohei Toriumi, Musashino (JP); Jun Kato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 311 days.

(21) Appl. No.: 17/637,662

(22) PCT Filed: Aug. 23, 2019

(86) PCT No.: PCT/JP2019/033030
§ 371 (c)(1),
(2) Date: Feb. 23, 2022

(87) PCT Pub. No.: WO2021/038628
PCT Pub. Date: Mar. 4, 2021

(65) Prior Publication Data
US 2022/0276366 A1   Sep. 1, 2022

(51) Int. Cl.
*G01S 13/34* (2006.01)
*G01S 7/35* (2006.01)
*G01S 13/38* (2006.01)

(52) U.S. Cl.
CPC ............ *G01S 13/341* (2013.01); *G01S 7/356* (2021.05); *G01S 13/38* (2013.01)

(58) Field of Classification Search
CPC ......... G01S 13/341; G01S 13/38; G01S 7/356
See application file for complete search history.

(56) References Cited

FOREIGN PATENT DOCUMENTS

JP      H5150035        6/1993
JP      5695925 B2 *    4/2015  ........... G01S 13/345
(Continued)

OTHER PUBLICATIONS

Rao, "Introduction to mmwave Sensing: FMCW Radars," Texas Instruments, Inc., retrieved on Jul. 4, 2019, retrieved from URL <https://training.ti.com/sites/default/files/docs/mmwaveSensing-FMCW-offlineviewing_0.pdf>, 70 pages.
(Continued)

*Primary Examiner* — Vladimir Magloire
*Assistant Examiner* — Maxine McKenzie Phillips
(74) *Attorney, Agent, or Firm* — Fish & Richardson P.C.

(57) ABSTRACT

A radar apparatus of the present embodiment includes a transmitting unit that transmits a frequency chirp signal whose frequency linearly changes with time, a receiving unit that receives a reflected wave that is the frequency chirp signal reflected by an object, a mixer that mixes the transmitted frequency chirp signal and the received reflected wave to obtain a beat signal, a frequency estimation unit that estimates a frequency of the beat signal, and a distance estimation unit that estimates a distance to the object based on the frequency of the beat signal. The frequency estimation unit calculates an autoregressive coefficient of an autoregressive model from a sequence of discrete signal values of the beat signal and estimates the frequency of the beat signal using a base frequency that is based on a pole of the autoregressive model.

6 Claims, 13 Drawing Sheets

(56) References Cited

FOREIGN PATENT DOCUMENTS

| JP | 2016070701 | | 5/2016 | |
|----|------------|---|--------|---|
| KR | 20110138690 A | * | 12/2011 | |
| KR | 101363543 B1 | * | 2/2014 | |
| RU | 2589737 C1 | * | 7/2016 | |
| WO | WO-2004079912 A1 | * | 9/2004 | ........... H03C 3/0908 |
| WO | WO-2019123613 A1 | * | 6/2019 | ............. G01S 13/36 |

OTHER PUBLICATIONS

Saruwatari, "Sound information processing theory Signal processing in speech processing 2-Linear predictive analysis," Graduate School of Information Science and Technology, The University of Tokyo/Nara Senbata University, dated Oct. 2015, retrieved from URL <https://ahcweb01.naist.jp/lecture/2015/sp/material/sp-v2-2.pdf>, 61 pages (with English Translation).

* cited by examiner

RADAR APPARATUS AND DISTANCE MEASUREMENT METHOD

CROSS-REFERENCE TO RELATED APPLICATIONS

This application is a National Stage application under 35 U.S.C. § 371 of International Application No. PCT/JP2019/033030, having an International Filing Date of Aug. 23, 2019, the disclosure of which is considered part of the disclosure of this application, and is incorporated in its entirety into this application.

TECHNICAL FIELD

The present invention relates to a radar apparatus and a distance measurement method.

BACKGROUND ART

A frequency-modulated continuous wave (FMCW) radar is a radar that estimates the position, velocity, and angle of an object using a frequency chirp signal whose frequency increases linearly with time (see NPL 1). Specifically, the FMCW radar transmits a frequency chirp signal, receives the frequency chirp signal reflected by the object, and estimates the position, velocity, and angle of the object from the frequency components of a beat signal obtained by mixing the transmitted signal and the received signal. General FMCW radars of the related art obtain the frequency components of the beat signal using Fourier transform.

NPL 2 suggests spectrum estimation using a linear prediction technique.

CITATION LIST

Non Patent Literature

NPL 1: Sandeep Rao, "Introduction to mmwave Sensing: FMCW Radas," Texas Instruments Inc., Internet <URL: https://training.ti.com/sites/default/files/docs/mmwave-Sensing-FMCW-offlineviewing_0.pdf>

NPL 2: Hiroshi Saruwatari, "Signal Processing in Speech Processing 2—Linear Predictive Analysis-," Internet <URL: https://ahcweb01.naist.jp/lecture/2015/sp/material/sp-v2-2.pdf

SUMMARY OF THE INVENTION

Technical Problem

To estimate the distance with high accuracy and high resolution, it is necessary for the FMCW radar to estimate the frequency of the beat signal with high accuracy.

However, the frequency estimation method of the related art assumes periodicity and broad-sense stationarity of observed signals, which lowers the accuracy of frequency estimation for a signal that can be observed only in a short time such as a beat signal obtained by an FMCW radar. Thus, there is a problem of lowering the measurement accuracy of the radar.

The frequency estimation method using the linear prediction technique of NPL 2 assumes that an analytic signal has broad-sense stationarity, which lowers the accuracy of the solution. Although useful in the design of digital audio filters, this frequency estimation method has a problem of lowering the accuracy of frequency estimation.

The present invention has been made in view of the above and it is an object of the present invention to improve the measurement accuracy of the radar.

Means for Solving the Problem

A radar apparatus of an aspect of the present invention includes a transmitting unit configured to transmit a signal having a constant frequency or a continuous wave signal obtained by modulating the signal, a receiving unit configured to receive a reflected wave that is the continuous wave signal reflected by an object, a mixer configured to mix the received reflected wave and the continuous wave signal to obtain a beat signal, a frequency estimation unit configured to estimate a frequency of the beat signal, and a distance estimation unit configured to estimate a distance to the object based on the frequency of the beat signal, wherein the frequency estimation unit calculates an autoregressive coefficient of an autoregressive model from a sequence of discrete signal values of the beat signal and estimates the frequency of the beat signal using a base frequency that is based on a pole of the autoregressive model.

A distance measurement method of an aspect of the present invention includes transmitting a signal having a constant frequency or a continuous wave signal obtained by modulating the signal, receiving a reflected wave that is the continuous wave signal reflected by an object, mixing the received reflected wave and the continuous wave signal to obtain a beat signal, estimating a frequency of the beat signal, and estimating a distance to the object based on the frequency of the beat signal, wherein, in estimating of the frequency, an autoregressive coefficient of an autoregressive model is calculated from a sequence of discrete signal values of the beat signal and the frequency of the beat signal is estimated using a base frequency that is based on a pole of the autoregressive model.

Effects of the Invention

The present invention can improve the measurement accuracy of the radar.

DESCRIPTION OF EMBODIMENTS

Hereinafter, embodiments of the present invention will be described with reference to the drawings.

Figure 1:
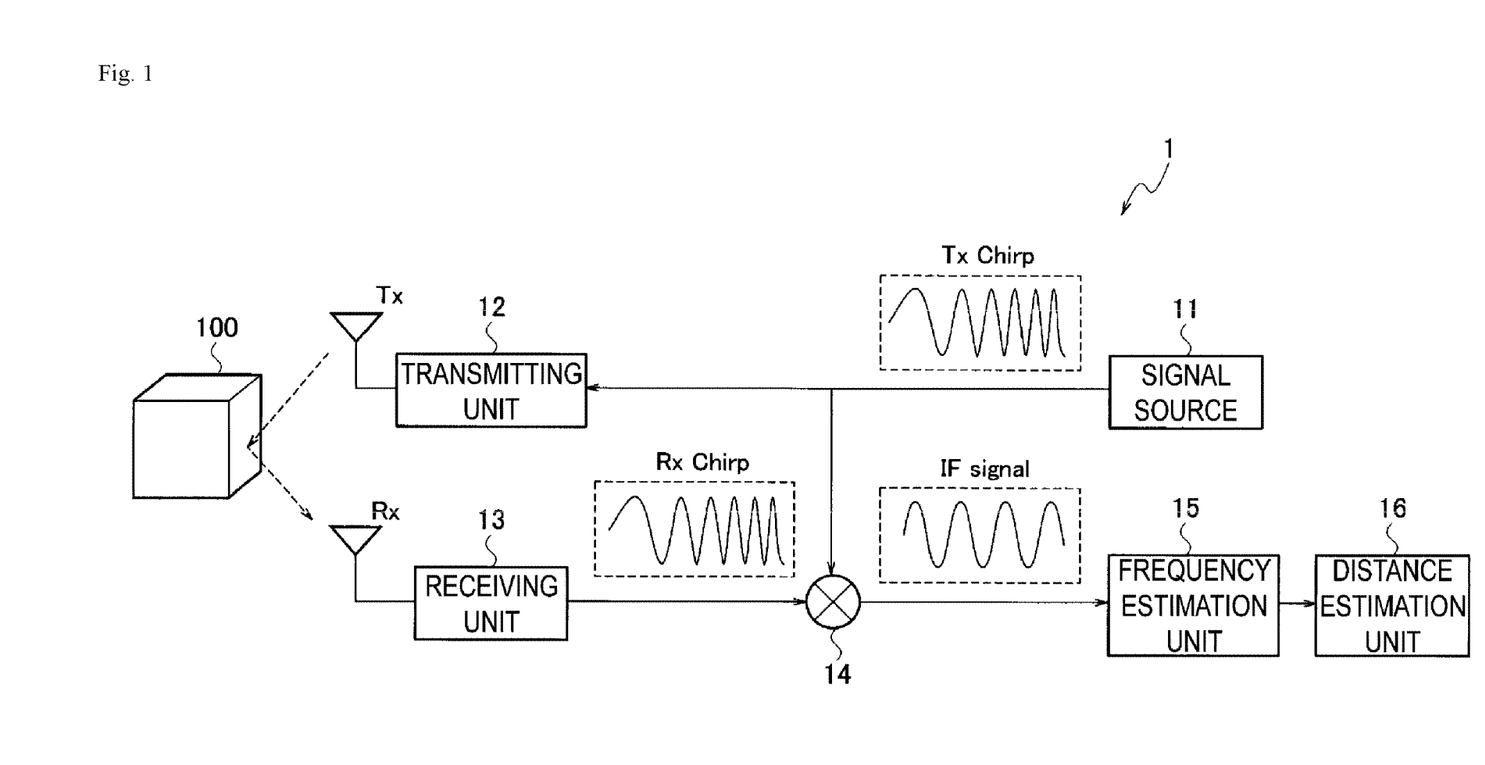
FIG. 1 is a functional block diagram illustrating a configuration of a radar apparatus according to the present embodiment.

A radar apparatus 1 of the present embodiment will be described with reference to FIG. 1. The radar apparatus 1 illustrated in FIG. 1 includes a signal source 11, a transmitting unit 12, a receiving unit 13, a mixer 14, a frequency estimation unit 15, and a distance estimation unit 16.

Figure 2:
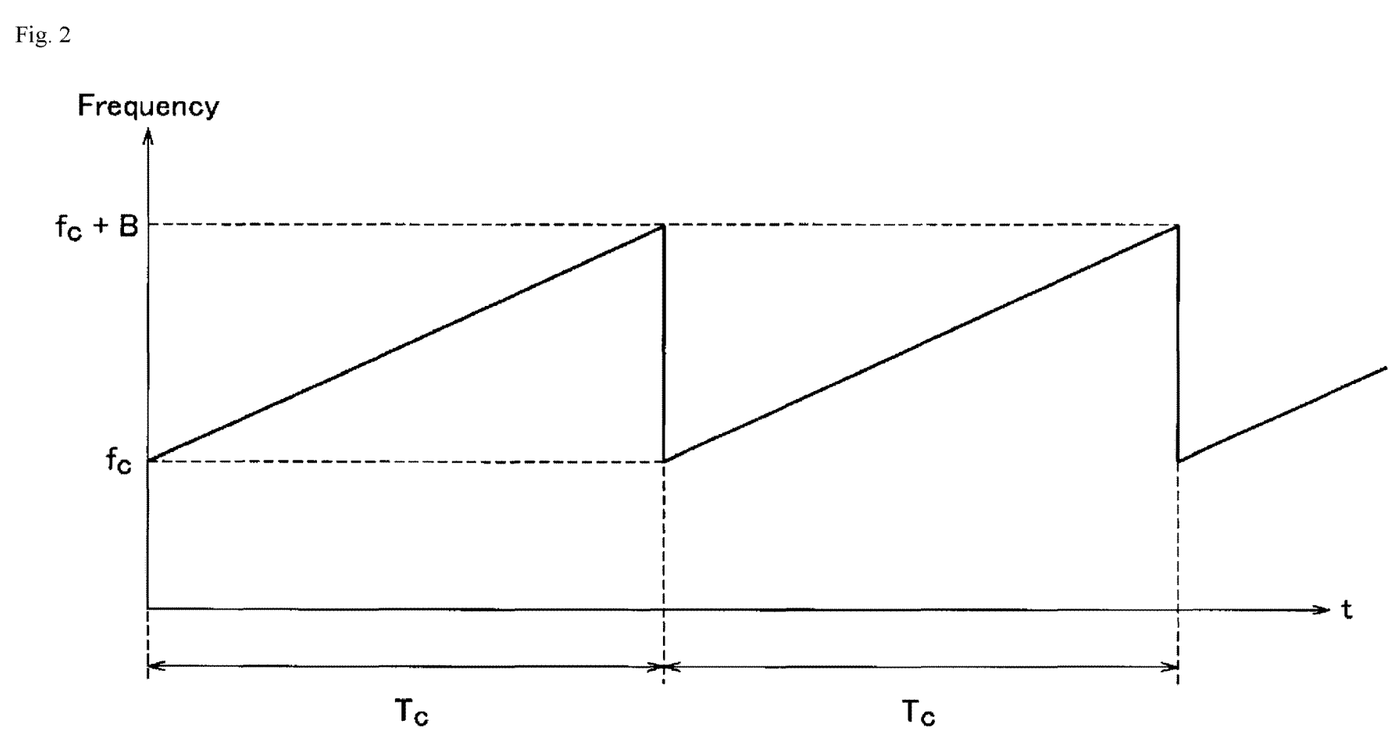
FIG. 2 is a diagram illustrating an example of a chirp signal.

The signal source 11 generates a frequency chirp signal whose frequency linearly increases with time as illustrated in FIG. 2. In FIG. 2, the horizontal axis represents time and the vertical axis represents frequency. The frequency chirp signal illustrated FIG. 2 linearly increases in frequency from fc to fc+B over a duration Tc. fc is a starting frequency and B is a bandwidth. For example, the signal source 11 generates a frequency chirp signal in a millimeter wave band. The signal source 11 may generate a frequency chirp signal whose frequency decreases linearly with time or may alternately generate a frequency chirp signal whose frequency increases linearly and a frequency chirp signal whose frequency decreases linearly.

The transmitting unit 12 transmits the frequency chirp signal generated by the signal source 11 through a transmitting antenna.

The receiving unit 13 receives a reflected wave that is the transmitted wave reflected by the object 100 through a receiving antenna. The receiving unit 13 may include a plurality of receiving antennas.

The mixer 14 mixes the transmission signal (Tx Chirp in FIG. 1) transmitted by the transmitting unit 12 and the reception signal (Rx Chirp in FIG. 1) received by the receiving unit 13 to obtain a beat signal (IF signal in FIG. 1) having a difference between the frequency components of the two signals.

The frequency estimation unit 15 converts the beat signal into a digital signal (a sequence of discrete signal values) through an analog-digital converter, calculates autoregressive coefficients from the sequence of discrete signal values, and uses the poles of an obtained autoregressive model as base frequencies to estimate a frequency. Details of the processing of the frequency estimation unit 15 will be described later.

The distance estimation unit 16 estimates the distance to the object based on the frequency estimated by the frequency estimation unit 15. The distance estimation unit 16 may estimate the velocity and angle of the object in addition to the distance to the object.

Figure 3A:
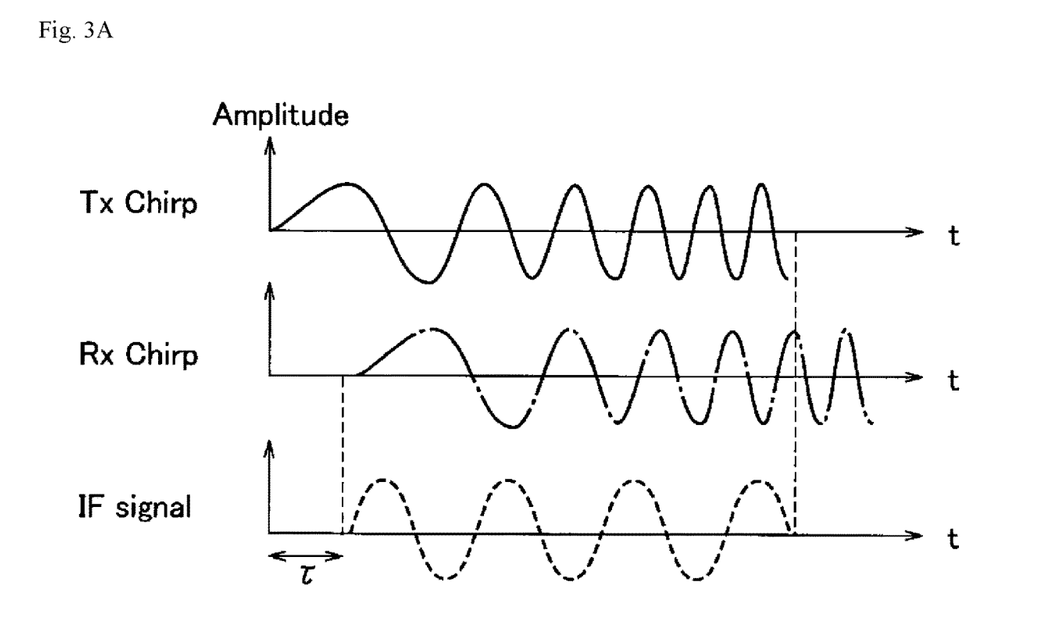
FIG. 3A is a diagram illustrating a transmission signal, a reception signal, and an intermediate frequency signal as they change in amplitude with time.
Figure 3B:
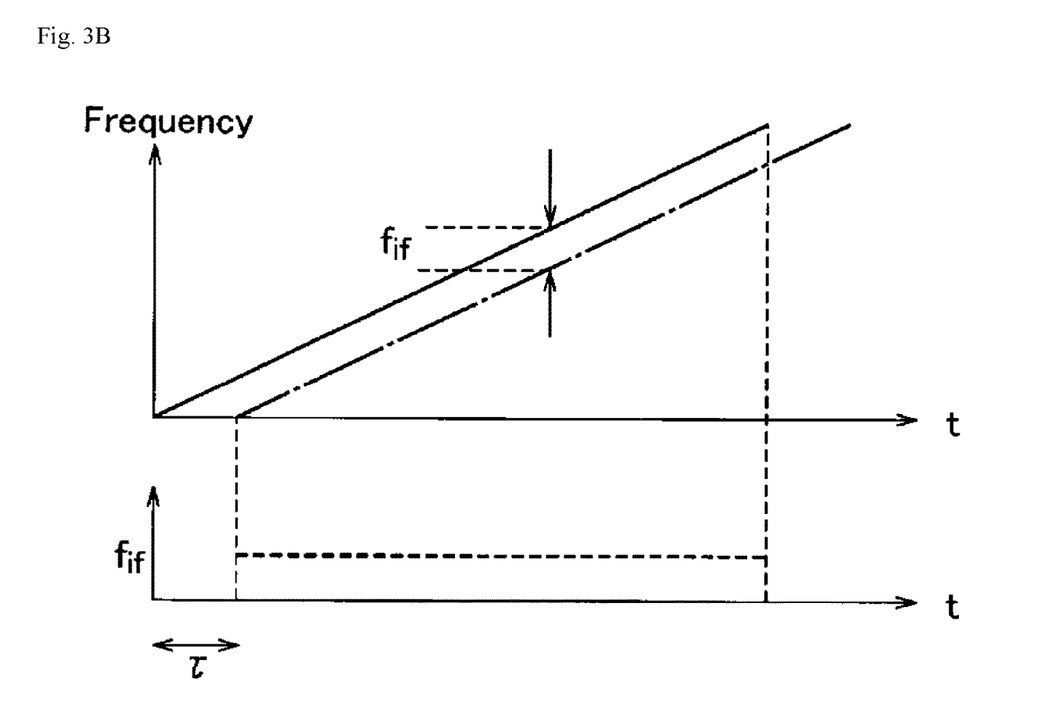
FIG. 3B is a diagram illustrating the signals of FIG. 3A as they change in frequency with time.

Next, generation of the beat signal will be described with reference to FIGS. 3A and 3B. In FIG. 3A, the transmission signal, the reception signal, and the beat signal are shown with time on the horizontal axis and amplitude on the vertical axis. In FIG. 3B, the transmission signal, the reception signal, and the beat signal are shown with time on the horizontal axis and frequency on the vertical axis.

The reception signal is received with a delay of time $\tau$ corresponding to the distance from the transmission of the transmission signal to the object. As illustrated in FIG. 3A, the mixer 14 mixes the transmission signal and the reception signal which have the same waveform but with a delay of time $\tau$. Because the mixing operation corresponds to taking the difference in frequency between the two signals, the resulting beat signal has a constant frequency $f_{if}$ as illustrated in FIG. 3B.

The frequency $f_{if}$ of the beat signal is expressed by the following equation using the delay time $\tau$ and the slope s=B/Tc of the frequency chirp signal.

$$f_{if} = s\tau \quad \text{[Math. 1]}$$

The distance d to the object is expressed by the following equation using the delay time $\tau$ and the speed of light c.

$$d = \frac{c\tau}{2} \quad \text{[Math. 2]}$$

From these equations, the distance d to the object is expressed by the following equation (1).

[Math. 3]

$$d = \frac{c}{2s} \cdot f_{if} \quad (1)$$

Estimation of the frequency $f_{if}$ of the beat signal allows the distance d to be obtained from equation (1).

Next, the process of estimating the frequency of the beat signal by the frequency estimation unit 15 will be described.

The frequency estimation unit 15 estimates the autoregressive model strictly without assuming the periodicity and stationarity of the beat signal and estimates the frequency of the beat signal using poles obtained from the autoregressive model as base frequencies. A specific procedure (having steps 1 and 2) is shown below.

In step 1, the frequency estimation unit 15 calculates autoregressive coefficients of order M obtained from the sequence of discrete signal values.

The frequency estimation unit 15 obtains M autoregressive coefficients $\{a_m | m=1, 2, \ldots, M\}$ that minimize an error $\varepsilon[n]$, assuming that a linear combination of the following equation (2) holds.

[Math. 4]

$$s[n] + a_1 s[n-1] + a_2 s[n-2] \ldots + a_m s[n-M] = \varepsilon[n] \quad (2)$$

Figure 4:
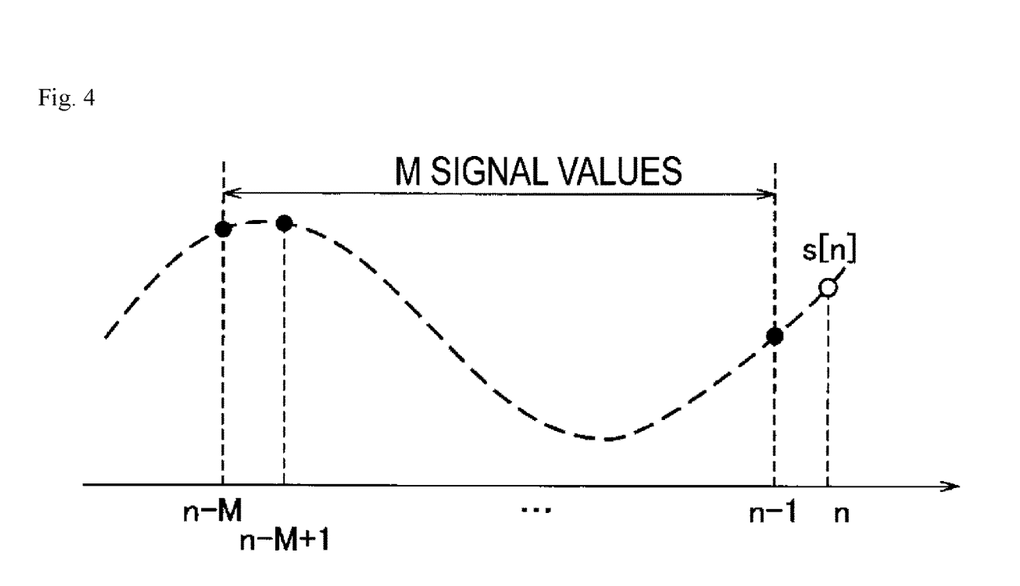
FIG. 4 is a diagram illustrating a state of sampling a beat signal.

Here, the sequence of discrete signal values $\{s[n] | n=0, 1, 2, \ldots, N-1\}$ is a discrete-time analytic signal obtained by sampling the beat signal within its signal duration ($0 \leq n \leq N-1$) at predetermined intervals as illustrated in FIG. 4.

To minimize the error $\varepsilon[n]$ in the range of $0 \leq n \leq N-1$, a least squares sum $\eta$ is calculated as follows.

[Math. 5]

$$\eta = \sum_{n=0}^{N-1} \varepsilon[n]^2 = \sum_{i=0}^{M} \sum_{j=0}^{M} a_i a_j \sum_{n=M}^{N-1} s[n-i]s[n-j] = \sum_{i=0}^{M} \sum_{j=0}^{M} a_i a_j r_{ij}$$

Here, a convolution operation is performed only within the signal duration as shown in the following equation (3) to obtain each autocorrelation coefficient $r_{ij}$.

[Math. 6]

$$r_{ij} = \sum_{n=M}^{N-1} s[n-i]s[n-j] \quad (3)$$

Because the range of variables i and j is 0≤i and j≤M, the minimum of n in the equation (3) is set to M, such that 0≤n−i and 0≤n−j always hold, and the convolution operation is performed only within the signal duration.

Linear prediction coefficients $a_i$ that minimize η are obtained by setting its derivative with respect to $a_j$ to 0.

[Math. 7]

$$\frac{d\eta}{da_j} = \sum_{i=0}^{M} a_i r_{ij} = 0$$

Letting $a_0=1$, the following relationship holds.

[Math. 8]

$$\sum_{i=1}^{M} a_i r_{ij} = -r_{0j}$$

This equation can be expressed as a matrix as in the following equation.

[Math. 9]

$$\begin{pmatrix} r_{11} & r_{12} & \cdots & r_{1M} \\ r_{21} & r_{22} & \cdots & r_{2M} \\ \vdots & \ddots & \ddots & \vdots \\ r_{M1} & r_{M2} & \cdots & r_{MM} \end{pmatrix} \begin{pmatrix} a_1 \\ a_2 \\ \vdots \\ a_M \end{pmatrix} = - \begin{pmatrix} r_{01} \\ r_{02} \\ \vdots \\ r_{0M} \end{pmatrix}$$

The autoregressive coefficients $a_m$ are calculated using the following equation (4).

[Math. 10]

$$\begin{pmatrix} a_1 \\ a_2 \\ \vdots \\ a_M \end{pmatrix} = - \begin{pmatrix} r_{11} & r_{12} & \cdots & r_{1M} \\ r_{21} & r_{22} & \cdots & r_{2M} \\ \vdots & \ddots & \ddots & \vdots \\ r_{M1} & r_{M2} & \cdots & r_{MM} \end{pmatrix}^{-1} \begin{pmatrix} r_{01} \\ r_{02} \\ \vdots \\ r_{0M} \end{pmatrix} \quad (4)$$

Thus, the present embodiment uses the following autocorrelation matrix R, to improve the accuracy of autoregressive coefficients and frequency estimation.

[Math. 11]

$$R_{xx} = \begin{pmatrix} r_{11} & r_{12} & \cdots & r_{1M} \\ r_{21} & r_{22} & \cdots & r_{2M} \\ \vdots & \ddots & \ddots & \vdots \\ r_{M1} & r_{M2} & \cdots & r_{MM} \end{pmatrix}$$

In step 2, the frequency estimation unit 15 estimates M waves (bases) from poles obtained from the autoregressive model represented by equation (2) to obtain the frequency of the beat signal.

When equation (2) is z-transformed, it can be expressed as the following equation.

[Math. 12]

$$S(z)+a_1 z^{-1} S(z)+a_2 z^{-2} S(z) \ldots +a_M z^{-M} S(z)=E(z)$$

Here, S(z) and E(z) represent the z-transforms of s[n] and ε[n], respectively.

This equation is transformed into the following equation.

[Math. 13]

$$S(z) = \frac{E(z)}{1 + a_1 z^{-1} + a_2 z^{-2} \ldots + a_M z^{-M}} = \frac{E(z)}{X(z)}$$

In this equation, M complex numbers $x_m$ (poles) at which $X(x_m)=0$ are obtained. When the complex numbers $x_m$ are expressed by the following equation, $x_m$ can be interpreted as waves (bases) oscillating with increasing or decreasing amplitudes.

[Math. 14]

$$S(z)+a_1 z^{-1} S(z)+a_2 z^{-2} S(z) \ldots +a_M z^{-M} S(z)=E(z)$$

The rate of increase or decrease $\lambda_m$ and the frequency $f_m$ are calculated using the following equations (5).

[Math. 15]

$$\lambda_m = \mathrm{Re}\frac{\ln x_m}{\Delta T}, f_m = Im \frac{\ln x_m}{2\pi \Delta T} \quad (5)$$

Here, ΔT is the sampling interval.

The frequency estimation unit 15 obtains M frequencies $f_m$ as base frequencies from the M poles obtained from the autoregressive model to estimate the frequency of the beat signal. The frequency estimation unit 15 may use the M rates of increase or decrease $\lambda_m$ and the M frequencies $f_m$ to express the beat signal as a superposition of M waves oscillating with increasing or decreasing amplitudes to obtain the frequency of the beat signal.

Next, a frequency estimation method using the linear prediction technique of the related art will be described as a comparative example.

The related art assumes that the analytic signal has broad-sense stationarity, regarding the autocorrelation coefficients $r_{ij}$ of the above equation (3) in step 1, and considers an infinite length signal and approximates the autocorrelation coefficients $r_{ij}$ with s[n]=0 outside the signal duration as in the following equation (6).

[Math. 16]

$$r_{ij} = \sum_{n=0}^{N-M-1} s[n-i]s[n-j] \sim \sum_{n=-\infty}^{\infty} s[n-i]s[n-j] = \sum_{n=-\infty}^{\infty} s[n]s[n+|i-j|] = R_{|i-j|} \quad (6)$$

Here, $s[n]=0$, ($n<0$ or $N-1<n$).

In the related art, the autocorrelation coefficients are represented only by the time difference between signals, such that the autocorrelation matrix $R'_{xx}$ is a Toeplitz matrix which has the same elements in each diagonal as shown below.

[Math. 17]
$$R'_{xx} = \begin{pmatrix} R_0 & R_1 & \cdots & R_{M-1} \\ R_1 & R_0 & \cdots & R_{M-2} \\ \vdots & \ddots & \ddots & \vdots \\ R_{M-1} & R_{M-2} & \cdots & R_0 \end{pmatrix}$$

Thus, the following equation can be solved at a high speed or the solution can be obtained reliably.

[Math. 18]
$$\begin{pmatrix} R_0 & R_1 & \cdots & R_{M-1} \\ R_1 & R_0 & \cdots & R_{M-2} \\ \vdots & \ddots & \ddots & \vdots \\ R_{M-1} & R_{M-2} & \cdots & R_0 \end{pmatrix} \begin{pmatrix} a_1 \\ a_2 \\ \vdots \\ a_M \end{pmatrix} = - \begin{pmatrix} R_1 \\ R_2 \\ \vdots \\ R_M \end{pmatrix}$$

However, the related art assumes the periodicity of the analytic signal and thus performs the approximation of equation (6), which lowers the accuracy. Due to the approximation of equation (6), the rates of increase or decrease $\lambda_m$ of the obtained bases become 1 or less, guaranteeing that the analytic signal is expressed as a superposition of waves that oscillate while attenuating. The related art is useful in applications such as the design of digital audio filters, but lowers the accuracy of frequency estimation. If broad-sense stationarity is assumed for a signal having a short time width such as a beat signal of an FMCW radar, the signal cannot be analyzed accurately.

In the present embodiment, the frequency can be estimated with high accuracy even if the time width of the analytic signal is short because autocorrelation coefficients are calculated strictly using signal values in the duration without utilizing the approximation that assumes periodicity and broad-sense stationarity of the analytic signal.

Next, a frequency estimation method using the Fourier transform of the related art will be described as a comparative example.

In the related art in which the frequency components of the beat signal are obtained using Fourier transform, the distance resolution is limited by the bandwidth used.

The Fourier transform process for estimating the distance is called a range FFT. The minimum frequency $f_{min}$ that can be estimated with the Fourier transform is equal to the frequency resolution $\Delta f$ and is the reciprocal of the time width Tc of the analytic signal.

[Math. 19]
$$f_{min} = \Delta f = \frac{1}{T_c}$$

From this equation and equation (1), the distance resolution $d_{min}$ is limited by the bandwidth B used as shown in the following equation.

[Math. 20]
$$d_{min} = \frac{c}{2s} \cdot f_{min} = \frac{c}{2s} \cdot \frac{1}{T_c} = \frac{cT_c}{2B} \cdot \frac{1}{T_c} = \frac{c}{2B}$$

The Fourier transform assumes that the analytic signal has periodicity, such that the frequency resolution is limited by the time width. In the Fourier transform, the analytic signal is expressed as a superposition of a fundamental waveform, which is a waveform having the time width of the analytic signal as one period, and waveforms with multiples of the period of the fundamental waveform. Therefore, in the Fourier transform, it is not possible to correctly estimate the frequency when a waveform with less than one wavelength exists.

In the present embodiment, the accuracy of frequency estimation depends on the accuracy of the sequence of discrete signal values, but does not greatly depend on the time width Tc. Therefore, the distance to the object can be measured with higher resolution without being limited by the bandwidth.

Next, the results of applying the Fourier transform of the related art and the present embodiment as a method for estimating the frequency of an analytic signal simulating a beat signal will be described.

Figure 5:
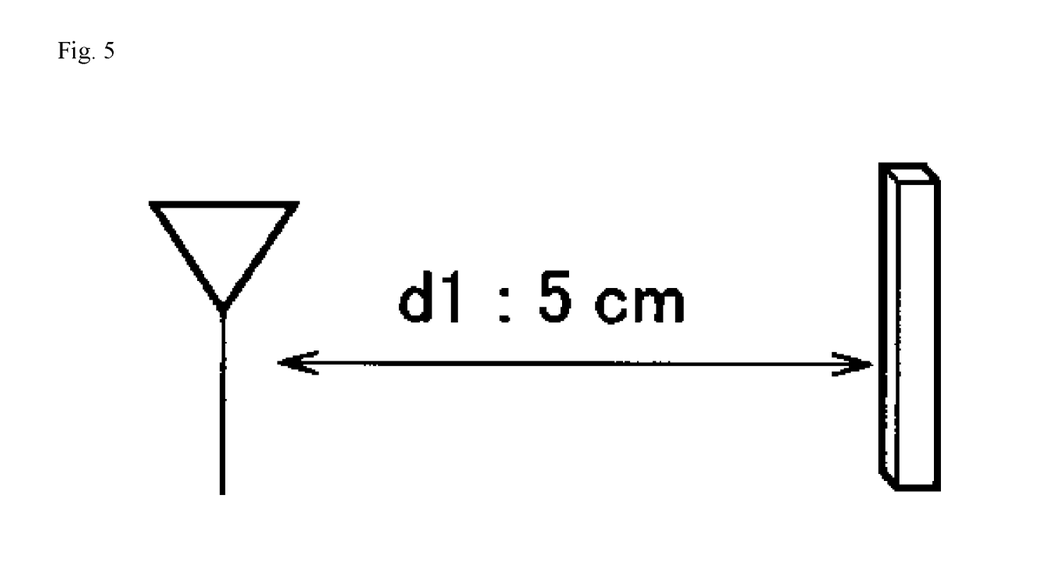
FIG. 5 is a diagram illustrating a state of estimating the distance to an object that is 5 cm apart from the radar apparatus.
Figure 6:
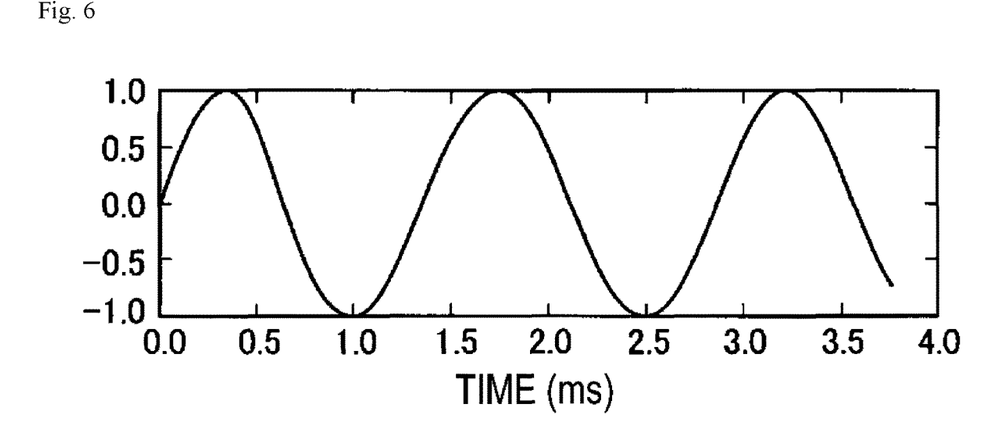
FIG. 6 is a diagram illustrating an example of a beat signal obtained in the situation of FIG. 5.
Figure 7A:
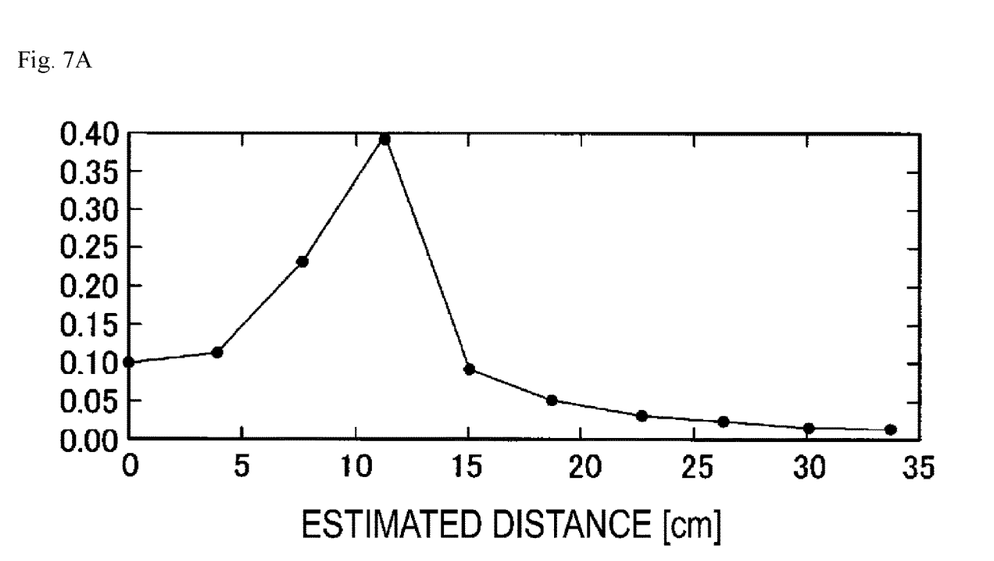
FIG. 7A is a diagram illustrating a result of estimating the distance to the object by Fourier transforming the beat signal of FIG. 6.
Figure 7B:
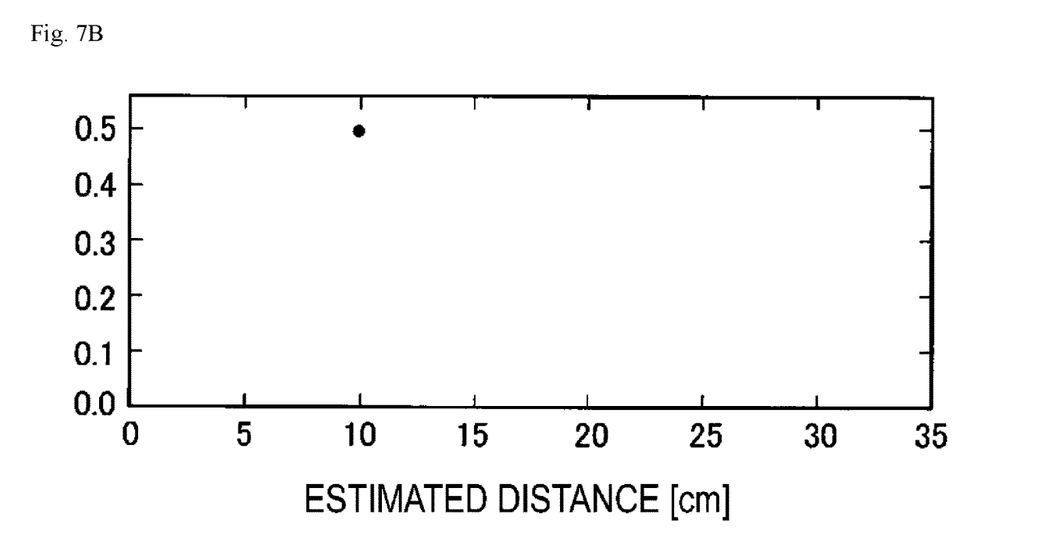
FIG. 7B is a diagram illustrating a result of estimating the distance to the object by analyzing the beat signal of FIG. 6 using a method of the present embodiment.

First, estimation results when a distance d1 from a radar to an object is 5 cm as illustrated in FIG. 5 will be described. FIG. 6 illustrates a beat signal that is a mixture of a transmission signal transmitted from the radar and a reception signal obtained by receiving a reflected wave that is reflected by the object. The distance estimation result using the Fourier transform illustrated in FIG. 7A was about 11 cm. The distance estimation result using the present embodiment illustrated in FIG. 7B was about 10 cm with an error of $3.6 \times 10^{-6}$ cm.

Figure 8:
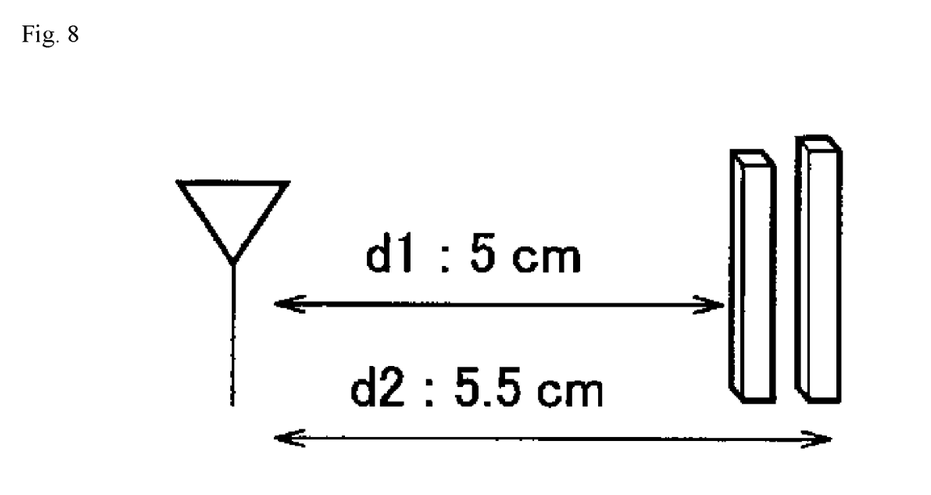
FIG. 8 is a diagram illustrating a state of estimating the distances to objects that are 5 cm and 5.5 cm apart from the radar apparatus.
Figure 9:
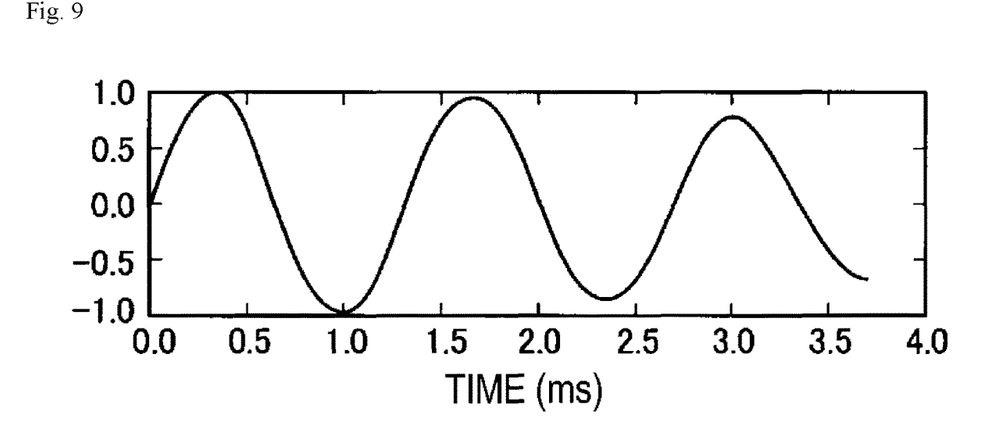
FIG. 9 is a diagram illustrating an example of a beat signal obtained in the situation of FIG. 8.
Figure 10A:
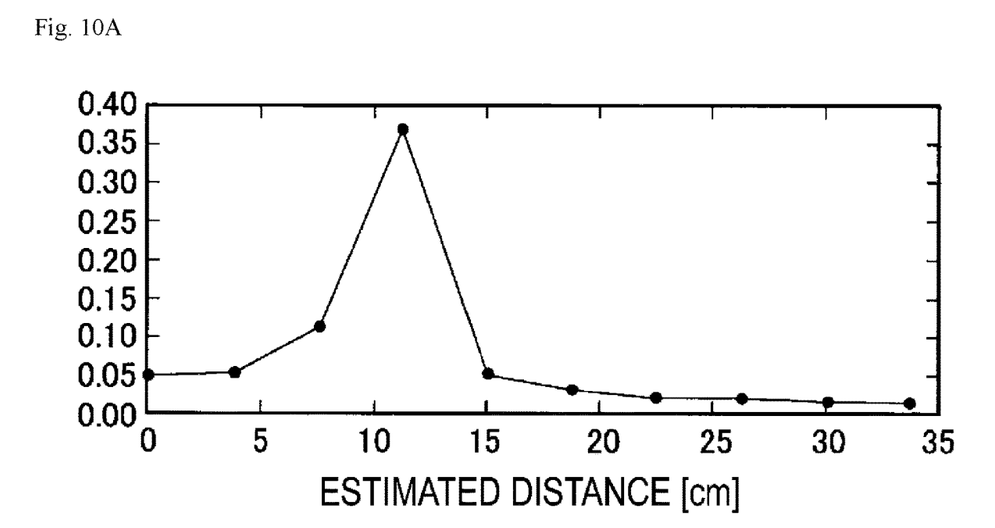
FIG. 10A is a diagram illustrating a result of estimating the distances to the objects by Fourier transforming the beat signal of FIG. 9.
Figure 10B:
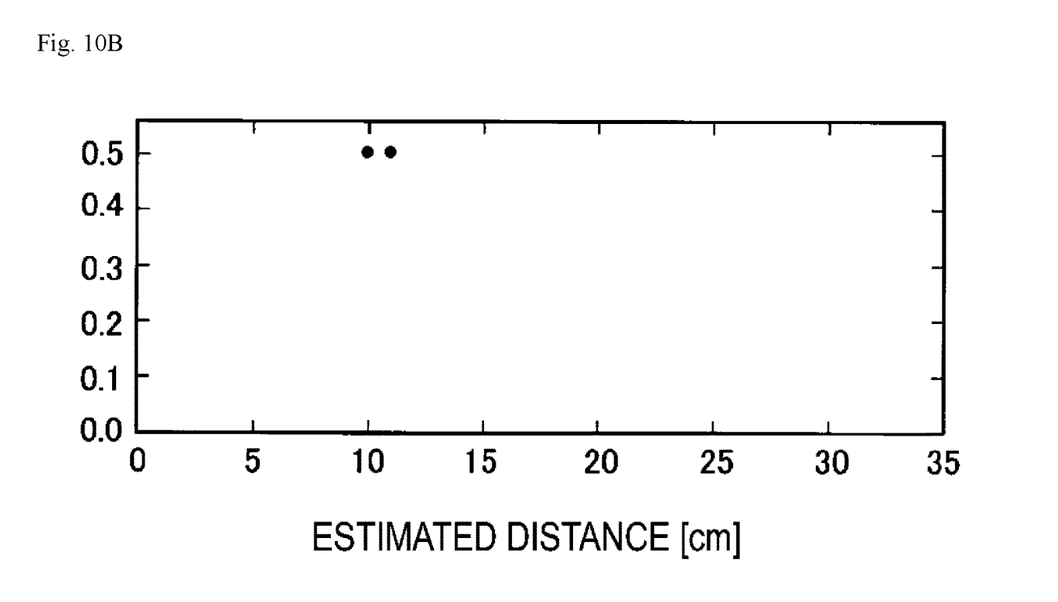
FIG. 10B is a diagram illustrating a result of estimating the distances to the objects by analyzing the beat signal of FIG. 9 using the method of the present embodiment.

Next, estimation results when distances d1 and d2 from a radar to two objects are 5 cm and 5.5 cm as illustrated in FIG. 8 will be described. FIG. 9 illustrates a beat signal that is a mixture of a transmission signal and a reception signal. In the distance estimation result using the Fourier transform illustrated in FIG. 10A, it was not possible to distinguish the objects that were present at positions of 5 cm and 5.5 cm apart. In the distance estimation result using the present embodiment illustrated in FIG. 10B, the two objects were able to be identified. The error of the distance d1 was $1.3 \times 10^{-3}$ cm and the error of the distance d2 was $2.8 \times 10^{-4}$ cm.

Considering that the resolution of the Fourier transform of the related art is 3.75 cm in the first place, it can be seen that the method of the present embodiment can achieve accuracy and resolution increases by the order of at least $10^3$.

As described above, in the radar apparatus 1 of the present embodiment, the transmitting unit 12 transmits a frequency chirp signal (a transmission signal) generated by the signal source 11, the receiving unit 13 receives the frequency chirp signal reflected by the object 100 (a reception signal), and the mixer 14 mixes the transmission signal and the reception signal to obtain a beat signal. The frequency estimation unit 15 performs a convolution operation of sequences of discrete signal values of the beat signal only within the duration of the beat signal to obtain autocorrelation coefficients, calculates autoregressive coefficients of an autoregressive model using the obtained autocorrelation coefficients, and estimates a frequency of the beat signal using base frequencies that are based on poles of the autoregressive model.

Then, the distance estimation unit 16 estimates the distance to the object 100 based on the frequency of the beat signal. Thus, the radar apparatus 1 of the present embodiment can estimate the frequency with high accuracy without being limited by the bandwidth B of the frequency chirp signal, such that the measurement accuracy of the radar apparatus 1 is improved.

The radar apparatus 1 of the present embodiment can also measure the velocity and angle of the object as in NPL 1. Although an FMCW radar has been described in detail above, the frequency estimation method of the present embodiment is not limited to the FMCW radar and is commonly applicable to continuous wave radars that transmit a signal having a constant frequency or a continuous wave signal obtained by modulating the signal.

An analysis method called Doppler FFT is used to estimate the velocity using a continuous wave radar (a CW radar). This is a method in which the velocity is obtained through Fourier transform by utilizing the fact that the phase change rate of the beat signal is proportional to the velocity of the object. Use of the proposed frequency estimation method when determining the phase change rate can increase the resolution of velocity measurement.

An analysis method called Angle FFT is also used to estimate the angle between the object and the transmitting and receiving units using a plurality of transmitting antennas and a plurality of receiving antennas. This is a method in which the intensities of reflection at various angles are obtained by Fourier transforming the phases between antennas by utilizing the fact that the phase of the beat signal obtained by each receiving antenna differs depending on the arrival direction of a radio wave. Use of the proposed frequency estimation method when determining the amount of phase change between antennas can increase the angular resolution.

REFERENCE SIGNS LIST

1 Radar apparatus
11 Signal source
12 Transmitting unit
13 Receiving unit
14 Mixer
15 Frequency estimation unit
16 Distance estimation unit
100 Object

The invention claimed is:

1. A radar apparatus comprising:
   a transmitting unit comprising an antenna and configured to transmit a signal having a constant frequency or a continuous wave signal obtained by modulating the signal;
   a receiving unit comprising one or more receiving antennas and configured to receive a reflected wave that is the continuous wave signal reflected by an object;
   a mixer configured to mix the received reflected wave and the continuous wave signal to obtain a beat signal;
   a frequency estimation unit comprising an analog-digital converter and configured to estimate a frequency of the beat signal; and
   a distance estimation unit configured to estimate a distance to the object based on the frequency of the beat signal,
   wherein estimating the frequency of the beat signal comprises:
      obtaining a sequence of discrete signal values by sampling the beat signal at predetermined intervals,
      determining an autoregressive model represented by a linear combination of the sequence of discrete signal values using a set of autoregressive coefficients,
      calculating each autoregressive coefficient of the autoregressive model, wherein the calculated autoregressive coefficients minimize the linear combination, and
      estimating the frequency of the beat signal using a base frequency that is based on a pole of the autoregressive model.

2. The radar apparatus according to claim 1, wherein the continuous wave signal is a frequency chirp signal whose frequency changes linearly with time.

3. The radar apparatus according to claim 1, wherein the frequency estimation unit calculates the set of autoregressive coefficients using an autocorrelation coefficient obtained by performing a convolution operation of the sequence of discrete signal values only within a duration of the beat signal.

4. A distance measurement method comprising:
   transmitting a signal having a constant frequency or a continuous wave signal obtained by modulating the signal;
   receiving a reflected wave that is the continuous wave signal reflected by an object;
   mixing the received reflected wave and the continuous wave signal to obtain a beat signal;
   estimating a frequency of the beat signal; and
   estimating a distance to the object based on the frequency of the beat signal,
   wherein estimating the frequency of the beat signal comprises:
      obtaining a sequence of discrete signal values by sampling the beat signal at predetermined intervals,
      determining an autoregressive model represented by a linear combination of the sequence of discrete signal values using a set of autoregressive coefficients,
      calculating each autoregressive coefficient of the autoregressive model, wherein the calculated autoregressive coefficients minimize the linear combination, and
      estimating the frequency of the beat signal using a base frequency that is based on a pole of the autoregressive model.

5. The distance measurement method according to claim 4, wherein the continuous wave signal is a frequency chirp signal whose frequency changes linearly with time.

6. The distance measurement method according to claim 4, wherein, in estimating of the frequency, the set of autoregressive coefficients is calculated using an autocorrelation coefficient obtained by performing a convolution operation of the sequence of discrete signal values only within a duration of the beat signal.

* * * * *